(12) United States Patent
Matsushita et al.

(10) Patent No.: US 9,008,090 B2
(45) Date of Patent: Apr. 14, 2015

(54) COMMUNICATION APPARATUS AND COMMUNICATION METHOD

(75) Inventors: Yosuke Matsushita, Osaka (JP); Yuki Fujiwara, Osaka (JP); Hideki Homma, Tokyo (JP); Naoki Morita, Fukuoka (JP); Go Kuroda, Osaka (JP)

(73) Assignee: Panasonic Intellectual Property Management Co.,Ltd., Osaka (JP)

( * ) Notice: Subject to any disclaimer, the term of this patent is extended or adjusted under 35 U.S.C. 154(b) by 728 days.

(21) Appl. No.: 12/666,198

(22) PCT Filed: Apr. 23, 2009

(86) PCT No.: PCT/JP2009/001862
§ 371 (c)(1),
(2), (4) Date: Jan. 15, 2010

(87) PCT Pub. No.: WO2009/130906
PCT Pub. Date: Oct. 29, 2009

(65) Prior Publication Data
US 2010/0195656 A1 Aug. 5, 2010

(30) Foreign Application Priority Data
Apr. 25, 2008 (JP) ................................ 2008-115683

(51) Int. Cl.
*H04L 12/28* (2006.01)
*H04L 12/56* (2006.01)
(Continued)

(52) U.S. Cl.
CPC ........... *H04W 74/0825* (2013.01); *H04L 49/55* (2013.01); *H04L 29/0653* (2013.01); *H04W 40/30* (2013.01); *H04W 84/18* (2013.01); *H04B 3/54* (2013.01)

(58) Field of Classification Search
USPC ......... 370/241, 242, 252, 389, 392, 216, 218, 370/229–235
See application file for complete search history.

(56) References Cited

U.S. PATENT DOCUMENTS 4,534,061 A * 8/1985 Ulug ................................ 455/17
5,040,175 A * 8/1991 Tuch et al. .................... 370/245
(Continued)

FOREIGN PATENT DOCUMENTS

EP  1 519 518     3/2005
JP  09-284304    10/1997
(Continued)

OTHER PUBLICATIONS

International Search Report issued Jun. 2, 2009 in International (PCT) Application No. PCT/JP2009/001862.
(Continued)

*Primary Examiner* — Ayaz Sheikh
*Assistant Examiner* — Blanche Wong
(74) *Attorney, Agent, or Firm* — Wenderoth, Lind & Ponack, L.L.P.

(57) ABSTRACT

A communication apparatus which, in an ad-hoc network, when receiving control packets from a plurality of terminals, can determine whether or not there is a collision among the control packets, and, based on the determination, can be prevented from continuing to be out of the network due to a collision among the control packets transmitted from the plurality of terminals. In the communication terminal, a communication section receives a control packet which periodically comes up on a communication path. When the communication apparatus receives a plurality of control packets which are defective in at least payload portions thereof within a predetermined time period, if a control section determines that source addresses included in header portions of the control packets which are defective in the payload portions thereof include a source address which is not identical to the other source addresses, the control section determines that the control packets are transmitted from a plurality of terminals and collide with each other.

9 Claims, 8 Drawing Sheets

(51) Int. Cl.
*H04W 74/08* (2009.01)
*H04L 12/939* (2013.01)
*H04L 29/06* (2006.01)
*H04W 40/30* (2009.01)
*H04W 84/18* (2009.01)
*H04B 3/54* (2006.01)

(56) References Cited

U.S. PATENT DOCUMENTS

| | | | | |
|---|---|---|---|---|
| 5,673,254 | A  * | 9/1997 | Crayford | 370/231 |
| 6,189,035 | B1 * | 2/2001 | Lockhart et al. | 709/229 |
| 6,427,169 | B1 * | 7/2002 | Elzur | 709/224 |
| 6,804,257 | B1 * | 10/2004 | Benayoun et al. | 370/471 |
| 6,990,069 | B1 * | 1/2006 | Ramakrishnan | 370/229 |
| 7,151,754 | B1 * | 12/2006 | Boyce et al. | 370/328 |
| 7,158,501 | B2 * | 1/2007 | Kasami et al. | 370/339 |
| 7,542,415 | B2 * | 6/2009 | Kang | 370/229 |
| 7,583,652 | B2 * | 9/2009 | Kasami et al. | 370/347 |
| 7,761,079 | B2 * | 7/2010 | Mollenkopf et al. | 455/402 |
| 8,446,907 | B2 * | 5/2013 | Du et al. | 370/394 |
| 2005/0068979 | A1 | 3/2005 | Boer et al. | |
| 2007/0165589 | A1 | 7/2007 | Sakoda | |
| 2007/0211751 | A1 | 9/2007 | Yoshikawa | |
| 2007/0286130 | A1 | 12/2007 | Shao et al. | |

FOREIGN PATENT DOCUMENTS

| | | |
|---|---|---|
| JP | 2008-048304 | 2/2008 |
| WO | 2005/041487 | 5/2005 |

OTHER PUBLICATIONS

Request for Comment 3626: "Optimized Link State Routing Protocol (OLSR)" Clausen & Jacquet, Oct. 2003, 1 page.
Request for Comment 3684: "Topology Dissemination Based on Reverse-Path Forwarding (TBRPF)" Ogier, et al., Feb. 2004, 1 page.
Request for Comment 3561: "Ad hoc On-Demand Distance Vector (AODV) Routing" Perkins et al., Jul. 2003, 1 page.
Request for Comment 4728: "The Dynamic Source Routing (DSR) Protocol for Mobile Ad Hoc Networks for IPv4" Johnson et al., Feb. 2007, 1 page.
Supplementary European Search Report issued Apr. 6, 2011 in corresponding European Application No. 09734332.1.

* cited by examiner

- TRANSMISSION TERMINAL
- RELAY TERMINAL
- RECEPTION TERMINAL
- SERVICE AREA
- COVER AREA

COMMUNICATION APPARATUS AND COMMUNICATION METHOD

TECHNICAL FIELD

The present invention relates to a communication apparatus and a communication method using a power line as a communication path.

BACKGROUND ART

In the field of wireless networks, a base station regularly transmits a beacon as a control packet. When a mobile terminal moves into the reaching area of the beacon, the mobile terminal receives the beacon and detects that the mobile terminal has entered an area where the mobile terminal can communicate with the base station. In a communication using a base station, mobile terminals which have received beacons all perform communications via the base station.

In addition, there is an ad-hoc wireless network in which terminals each perform relaying, thereby enabling communications of data between each relay terminal and a terminal which is present within a certain area around the relay terminal, without using a base station. In the ad-hoc wireless network, a terminal to perform relaying is not specified, which is different from the communication using a base station. Therefore, when communicating data between two terminals, it is necessary to specify, as a relay terminal, a terminal which is suitable for a relay with respect to a communication between the two terminals. Methods of exchanging control information for specifying a relay terminal are classified into a proactive method (for example, see Non-Patent Documents 1 and 2) in which control information is periodically exchanged, and a reactive method (for example, see Non-Patent Documents 3 and 4) in which control information is exchanged when starting a data communication. Generally, it is said that the proactive method is effective when the moving speed of a terminal is slow, and that the reactive method is effective when the moving speed of a terminal is fast.

PRIOR ART

Non-Patent Document

Non-Patent Document 1: "REQUEST FOR COMMENT 3626: Optimized Link State Routing Protocol (OLSR)"

Non-Patent Document 2: "REQUEST FOR COMMENT 3684: Topology Dissemination Based on Reverse-Path Forwarding (TBRPF)"

Non-Patent Document 3: "REQUEST FOR COMMENT 3561: Ad hoc On-Demand Distance Vector (AODV) Routing"

Non-Patent Document 4: "REQUEST FOR COMMENT 4728: The Dynamic Source Routing (DSR) Protocol for Mobile Ad Hoc Networks for IPv4"

DISCLOSURE OF THE INVENTION

Problems to be Solved by the Invention

In the case where the above conventional art is applied to a power line communication which uses a power line as a communication path, the following problems arise.

In fact, a terminal rarely moves in the power line communication. Therefore, it is effective to use the proactive method.

However, in an ad-hoc power line communication, a control packet with respect to, e.g., path information which is regularly exchanged is used to allow PLC (Power-Line Communication) terminals present in the network to be connected to each other. Moreover, in the power line communication, since a power line is used as the network, a state of a communication path changes at every moment depending on a condition of use of electrical apparatuses, for example, depending on change in the condition such as turning on a vacuum cleaner, and an area where a communication with a relay terminal can be performed also changes depending on the change in the state of the communication path. Therefore, a relay terminal used as a transmission source of a control packet received by one PLC terminal is also changed depending on the change in the state of the communication path, and the number of relay terminals may increase.

Thus, when a plurality of relay terminals to transmit a control packet come up in a communication area of one PLC terminal, each of the plurality of relay terminals transmits the control packet. Since the control packet is periodically transmitted from each relay terminal, when timings of the periods overlap with each other, the control packets transmitted from the relay terminals can collide with each other in the network. In this case, the PLC terminal cannot receive the control packet. As a result, there arises a problem that the PLC terminal continues to be out of the network.

On the other hand, there is a problem that the PLC terminal which receives the control packet cannot determine whether the PLC terminal cannot receive the control packet due to a noise being present in the network, or due to a collision among the control packets.

Therefore, considering the above problems, an object of the present invention is to provide a communication apparatus and a communication method which, in an ad-hoc network using a power line, when a control packet cannot be received for a certain time period, can determine whether the control packet cannot be received due to a noise in the network, or due to a collision among the control packets, and can be prevented from continuing to be out of the network due to a collision among the control packets transmitted from a plurality of relay terminals.

Solution to the Problems

To solve the above problems, the communication apparatus according to one aspect of the present invention includes a communication section for receiving a control packet which periodically comes up on a communication path; and a control section for, when the communication apparatus receives a plurality of control packets which are defective in at least payload portions thereof within a predetermined time period, if the control section determines that source addresses included in header portions of the control packets which are defective in the payload portions thereof include a source address which is not identical to the other source addresses, determining that the control packets are transmitted from a plurality of terminals and collide with each other.

A communication apparatus according to a first aspect includes: a communication section for receiving a control packet which periodically comes up on a communication path; and a control section for, when a plurality of control packets which are defective in at least payload portions thereof are received within a predetermined time period, if the control section determines that source addresses included in header portions of the control packets which are defective in the payload portions thereof include a source address which is not identical to the other source addresses, determining that the control packets are transmitted from a plurality of terminals and collide with each other.

When a plurality of relay terminals transmit control packets, a timing at which each of the plurality of relay terminals transmits the control packet toward the network is such that back-off times for transmission of the control packets are different among the plurality of relay terminals. Therefore, even if a collision occurs among the control packets, there is a high possibility that a header portion of a control packet transmitted prior to other control packets can reach a PLC terminal which is a target of communication.

Accordingly, in the present aspect, it is determined based on a header portion of a control packet whether or not there is a collision among control packets transmitted from a plurality of terminals.

That is, when the communication apparatus according to the present aspect receives a plurality of control packets which are defective in payload portions thereof within a predetermined time period among control packets which periodically come up in the network, the communication apparatus determines whether or not source addresses included in header portions of the control packets which are defective in the payload portions thereof include a source address which is not identical to the other source addresses. When there is a source address which is not identical to the other source addresses, the communication apparatus determines that the control packets are transmitted from the plurality of terminals and collide with each other. Thus, since the communication apparatus determines whether or not there is a collision among the control packets based on whether or not source addresses in header portions of the control packets, which are more likely to reach the target of communication than payload portions of the control packets, are identical, it can easily be determined whether the control packet cannot be received due to a noise or due to a collision. As a result, the communication apparatus can be prevented from continuing to be out of the network due to a collision among the control packets transmitted from the plurality of relay terminals.

In the communication apparatus according to a second aspect based on the above aspect, if the control section determines that source addresses included in header portions of the control packets which are defective in the payload portions thereof include a source address which is not identical to the other source addresses, and that the source addresses included in the header portions of the control packets which are defective are identical to an address of an original transmission source which transmits the control packets, the control section determines that the control packets are transmitted from the plurality of terminals and collide with each other.

In the communication apparatus according to a third aspect based on the above aspect, when the control packet is not received during a certain time period, the control section determines whether or not source addresses included in header portions of the plurality of control packets which are defective in the payload portions thereof include a source address which is not identical to the other source addresses.

In the communication apparatus according to the present aspect, when the control packet is received during a certain time period, it is determined whether or not source addresses included in header portions of the control packets which are defective in the payload portions thereof include a source address which is not identical to the other source addresses. Thus, at the phase where the communication apparatus does not receive, during a certain time period, the control packet which periodically comes up on a communication path, it is considered that there is a possibility that the control packet cannot be received due to a collision among the control packets in the network and it is determined whether or not there is a collision among the control packets, whereby determination of whether or not there is a collision among the control packets can efficiently be performed.

In the communication apparatus according to a fourth aspect based on the above aspect, if the control section determines that the control packets are transmitted from a plurality of terminals and collide with each other, the control section instructs one of the plurality of terminals to delay a timing of transmission of the corresponding control packet.

In the communication apparatus according to the present aspect, if it is determined that the control packets are transmitted from the plurality of terminals and collide with each other, one of the plurality of terminals is instructed to delay a timing of transmission of the corresponding control packet. Thus, since the control packet from the instructed terminal is transmitted later than those from the other terminals of the plurality of terminals, the control packet can be received from one of the plurality of terminals. As a result, the communication apparatus can be prevented from continuing to be unable to receive the control packet due to a collision among the control packets and to be substantially out of the network.

In the communication apparatus according to a fifth aspect based on the above aspect, the control section gives an instruction of delaying the timing of transmission of the control packet by at least one packet.

In the communication apparatus according to the present aspect, since the control section gives an instruction of delaying the timing of transmission of the control packet by at least one packet, the control packet from one of the plurality of terminals is transmitted with at least one packet delay in comparison with the control packets from the other terminals, whereby reception of the control packet can be ensured.

In the communication apparatus according to a sixth aspect based on the above aspect, when a plurality of control packets which are defective in at least payload portions thereof are received within the predetermined time period and when the control packets are defective also in header portions thereof, the control section instructs a terminal present within a communication area of the communication apparatus to change a probability of transmission of the control packet.

If even a header portion cannot be received during the predetermined time period, it is considered that, since the number of terminals which transmit control packets increases in the network, the number of overlapping timings of transmission of the control packets increases and a probability of collisions of the control packets also increases.

Accordingly, in the communication apparatus according to the present aspect, when a plurality of control packets which are defective in at least payload portions thereof are received within the predetermined time period and when the control packets are defective also in header portions thereof, the communication apparatus instructs a terminal present within a communication area of the communication apparatus to change a probability of transmission of the control data. Thus, since a state in which the reception terminal cannot continue to receive the control packet is changed by the instruction from the terminal receiving the control packet, a possibility that the reception terminal receives the control packet can be increased.

In the communication apparatus according to a seventh aspect based on the above aspect, the control packet is transmitted by broadcast.

The communication apparatus according to the present aspect is applicable also to the case where the control packets are transmitted by broadcast.

In the communication apparatus according to an eighth aspect based on the above aspect, the control packet includes a beacon signal.

The communication apparatus according to the present aspect is applicable also to the case where the control packet is a beacon signal.

In the communication apparatus according to a ninth aspect based on the above aspect, the communication path is a power line.

The communication apparatus according to the present aspect is applicable also to the case where the communication path is a power line.

A communication method according to a tenth aspect includes: a step of receiving a control packet which periodically comes up on a communication path; and a step of, when a plurality of control packets which are defective in at least payload portions thereof are received within a predetermined time period, if the control section determines that source addresses included in header portions of the control packets which are defective in the payload portions thereof include a source address which is not identical to the other source addresses, determining that the control packets are transmitted from a plurality of terminals and collide with each other.

In the communication method according to the present aspect, since whether or not there is a collision among the control packets is determined based on whether or not source addresses included in header portions of the control packets, which are more likely to reach the communication target than payload portions of the control packets, are identical, it can easily be determined whether the control packet cannot be received due to a noise or due to a collision. As a result, the communication apparatus can be prevented from continuing to be out of the network due to a collision among the control packets transmitted from the plurality of relay terminals.

Effect of the Invention

By using the communication apparatus according to the above aspects, in an ad-hoc network using a power line, when a control packet cannot be received for a certain time period, the communication apparatus can determine whether the communication apparatus cannot receive the control packet due to a noise in the network or due to a collision among the control packets, and can be prevented from continuing to be out of the network due to a collision among the control packets transmitted from a plurality of relay terminals.

DETAILED DESCRIPTION OF THE INVENTION (Embodiment 1)

Figure 1:
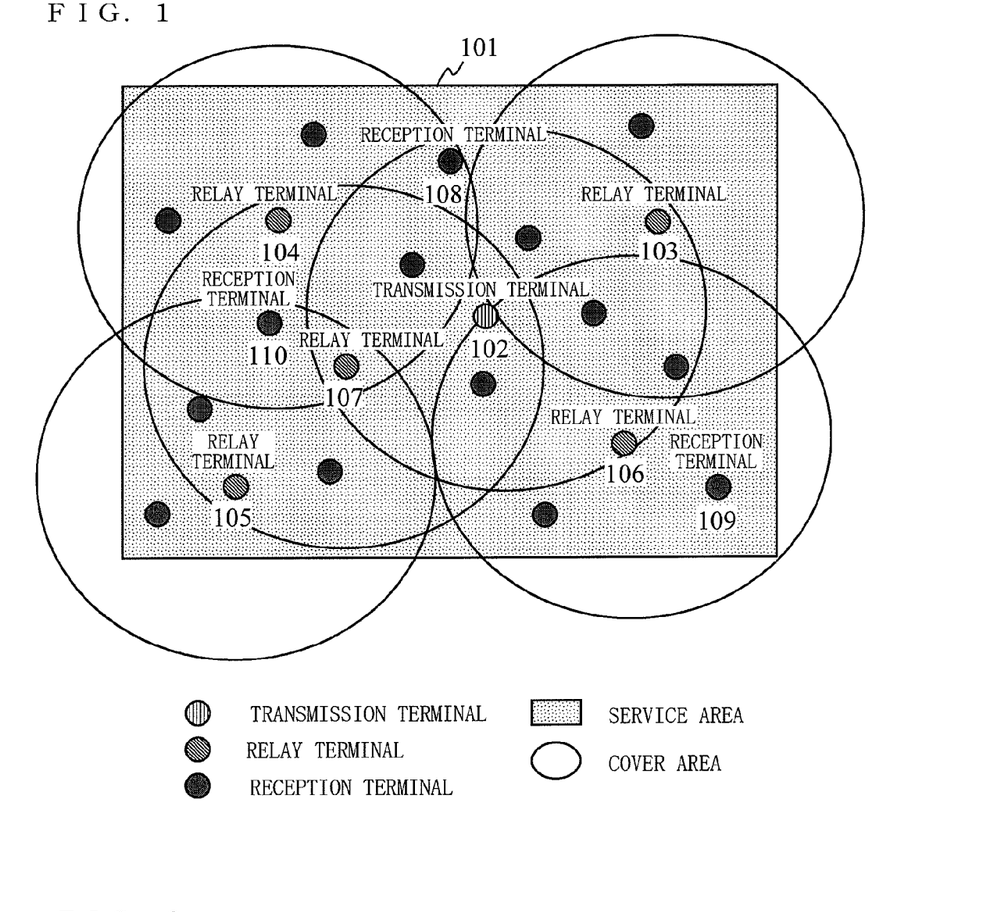
FIG. 1 shows a configuration of a network in one embodiment of the present invention.

FIG. 1 shows a network in which a communication apparatus and a communication method according to an embodiment of the present invention are used. In FIG. 1, the communication apparatus can be used for any of a transmission terminal, reception terminal, and relay terminal. Since a service area 101 of the network is larger than a cover area of each terminal, communications are mutually performed via relay terminals 103 to 107 to form an ad-hoc network. All the terminals (including reception terminals 108 to 110) in the service area 101 receive control packets with respect to, e.g., path information periodically transmitted from a transmission terminal 102, and thereby determine which terminal, among the relay terminals 103 to 107, should be selected as a relay terminal to perform a communication. For a method of selecting a relay terminal for transmitting a control packet to all the terminals, a proactive method is used, for example.

Figure 2:
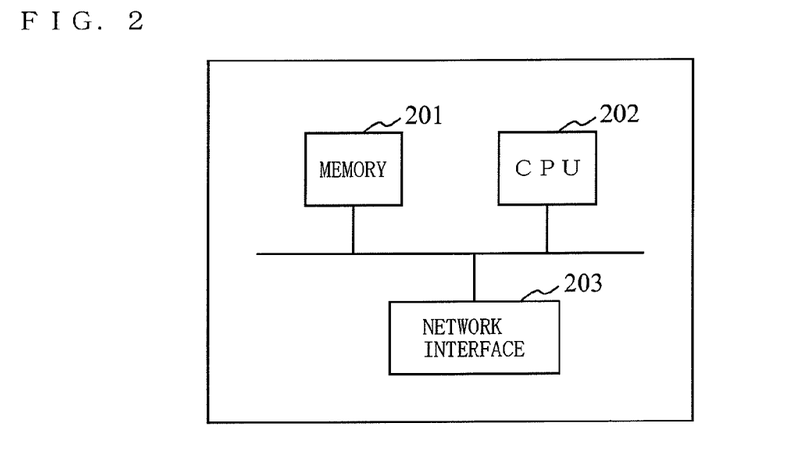
FIG. 2 shows in detail a configuration of a terminal used in the embodiment of the present invention.

FIG. 2 shows in detail a configuration of each terminal. As shown in FIG. 2, each terminal includes a memory 201 including various control programs and a work area, a CPU 202 which controls the whole terminal, and a network interface 203 which is connected to a power line and communicates various data via the power line. Each terminal executes a program stored in the memory 201 on the CPU 202, transmits data via the network interface 203, and decrypts data received via the network interface 203 on the CPU 202. Note that, the CPU 202, which controls the whole terminal, can be referred to as a control section, and the network interface 203, which takes charge of communication processing on the whole terminal, can be referred to as a communication section.

Figure 3:
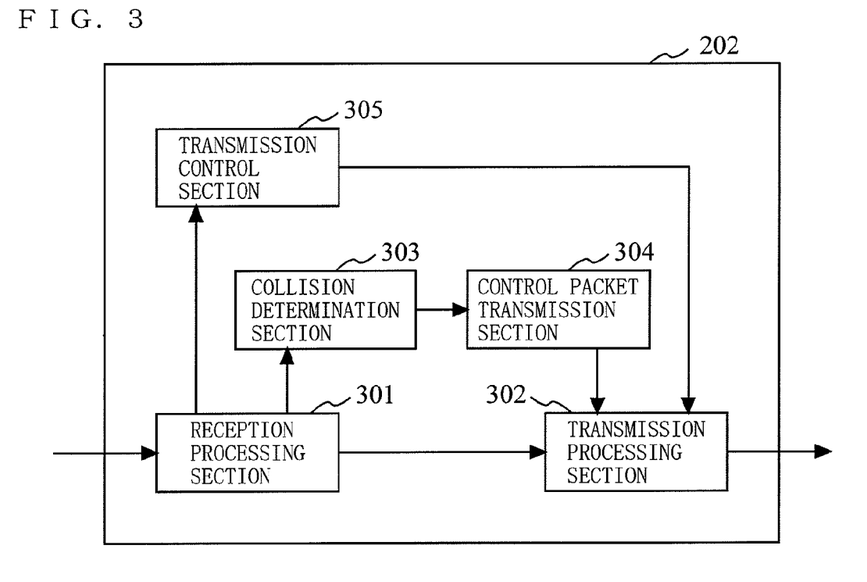
FIG. 3 is a block diagram of a function of a CPU 202.

FIG. 3 is a function block diagram showing functions executed by the CPU 202. Referring to FIG. 3, a reception processing section 301 receives all packets, including a control packet. When the communication apparatus functions as a reception terminal, the reception processing section 301 determines, from a packet header, whether or not a received packet is a packet (hereinafter, referred to as "flooding packet") transmitted to all the terminals. The reception processing section 301 outputs information about the arriving interval and source address of the flooding packet, or the like, to a collision determination section 303.

When the communication apparatus functions as a reception terminal, the collision determination section 303 determines, based on the information outputted from the reception processing section 301, whether a loss of flooding packet is due to a collision or due to a noise. Specifically, if the collision determination section 303 consecutively receives defective flooding packets during a certain time period and different source addresses are detected from header portions of the defective flooding packets, the collision determination section 303 determines that a loss is caused by a collision. That is, when a plurality of relay terminals transmit control packets, a timing at which each of the plurality of relay terminals transmits the control packet toward the network is such that back-off times for transmission of the control packets are different among the plurality of relay terminals. Therefore, even if a collision occurs among the control packets, there is a high possibility that a header portion of a control packet transmitted prior to other control packets can be received.

Thus, in the case where a loss of flooding packet is caused by a noise, the flooding packet cannot be received at all, or it does not occur that different source addresses are detected from header portions of defective flooding packets which are consecutively received during a certain time period. Therefore, the communication terminal can determine whether a loss of flooding packet is due to a collision or due to a noise.

Accordingly, in the present embodiment, it is determined based on a header portion of a control packet whether or not there is a collision among control packets transmitted from a plurality of terminals. When it is determined that a loss is caused by a collision, the collision determination section 303 requests a control packet transmission section 304 to transmit a control packet (hereinafter, referred to as "transmission timing control packet") for instructing a terminal transmitting a flooding packet to change a timing of transmission of the flooding packet.

Moreover, when the communication apparatus functions as a reception terminal, even if the collision determination section 303 consecutively receives defective flooding packets during a certain time period and header portions themselves are not detected from the defective flooding packets, the collision determination section 303 can determine that a loss is caused by a collision. That is, if a header portion is not detected from the defective flooding packets during a certain time period, it is considered that, since the number of terminals in the network which transmit the flooding packets increases, the number of overlapping timings of transmission of the flooding packets increases and a probability of collisions of the flooding packets also increases.

In this case, the collision determination section 303 requests the control packet transmission section 304 to transmit a control packet (hereinafter, referred to as "transmission probability control packet") for instructing a terminal present within a communication area of the reception terminal to change a probability of transmission of the flooding packet. Note that, the probability of transmission of a flooding packet is defined as the number of times a flooding packet is transmitted within a predetermined time period. For example, the relay terminal having received the transmission probability control packet changes a probability of transmission of the flooding packet such that, if the relay terminal has been transmitting the flooding packet five times within the predetermined time period, the relay terminal transmits the flooding packet three times, the timings of the three transmissions being selected from among the timings of the five transmissions. In this case, since a state in which the reception terminal cannot continue to receive the flooding packets is changed by the instruction from the reception terminal, a possibility of receiving the flooding packets increases.

Moreover, when the communication apparatus functions as a reception terminal, if the collision determination section 303 determines that packet losses are consecutively caused during a certain time period and that different source addresses are not detected from header portions of flooding packets, the collision determination section 303 determines that the losses of the flooding packets are temporarily caused by a noise.

When the communication apparatus functions as a reception terminal, the control packet transmission section 304 outputs a control packet to the transmission processing section 302 in accordance with a request from the collision determination section 303. When the control packet transmission section 304 is requested by the collision determination section 303 for a transmission timing control packet, the control packet transmission section 304 selects one of different source addresses detected from header portions of a plurality of flooding packets, and generates a transmission timing control packet to be transmitted to the selected source address by unicast. For example, the control packet transmission section 304 generates a transmission timing control packet for making a request for shifting a timing of transmission of the flooding packet by one packet. In this case, since the flooding packet from one of the plurality of terminals is transmitted with at least one packet delay in comparison with those from the other terminals, complete reception of the flooding packet can be ensured.

Moreover, when the control packet transmission section 304 is requested by the collision determination section 303 for a transmission probability control packet, the control packet transmission section 304 sets a probability of transmission in accordance with the number of nearby terminals, a loss rate of a unicast packet, and the like, and generates a transmission probability control packet to be transmitted by broadcast. For example, the control packet transmission section 304 generates a transmission probability control packet for requesting a relay terminal present within the communication area of the reception terminal, if the relay terminal has been transmitting the flooding packet five times within a predetermined period, to transmit the flooding packets three times, the timings of the three transmissions being selected from among the timings of the five transmissions. In this case, since a state in which the reception terminal cannot continue to receive the flooding packets is changed by the instruction from the reception terminal, a possibility of receiving the flooding packets increases.

When the communication apparatus functions as a relay terminal, the transmission control section 305 interprets the control packet passed from the reception processing section 301. If the received control packet is a transmission timing control packet, the transmission control section 305 changes a timing of transmission of the flooding packet. Specifically, the transmission control section 305 controls the timing of transmission of the flooding packet performed by the transmission processing section 302, in accordance with the received transmission timing control packet. Moreover, if the received control packet is a transmission probability control packet, the transmission control section 305 changes a probability of transmission of the flooding packet. Specifically, the transmission control section 305 controls the probability of transmission of the flooding packet performed by the transmission processing section 302, in accordance with the received transmission probability control packet.

The transmission processing section 302 performs transmission processing for all packets, including packets which are transmitted based on a request from the control packet transmission section 304. If an instruction is given by the transmission control section 305, the transmission processing section 302 changes transmission processing such as timing or probability of transmission of the flooding packet.

Hereinafter, operation of the communication apparatus of the present invention configured as above will be described referring to FIG. 4 to FIG. 12.

Figure 4:
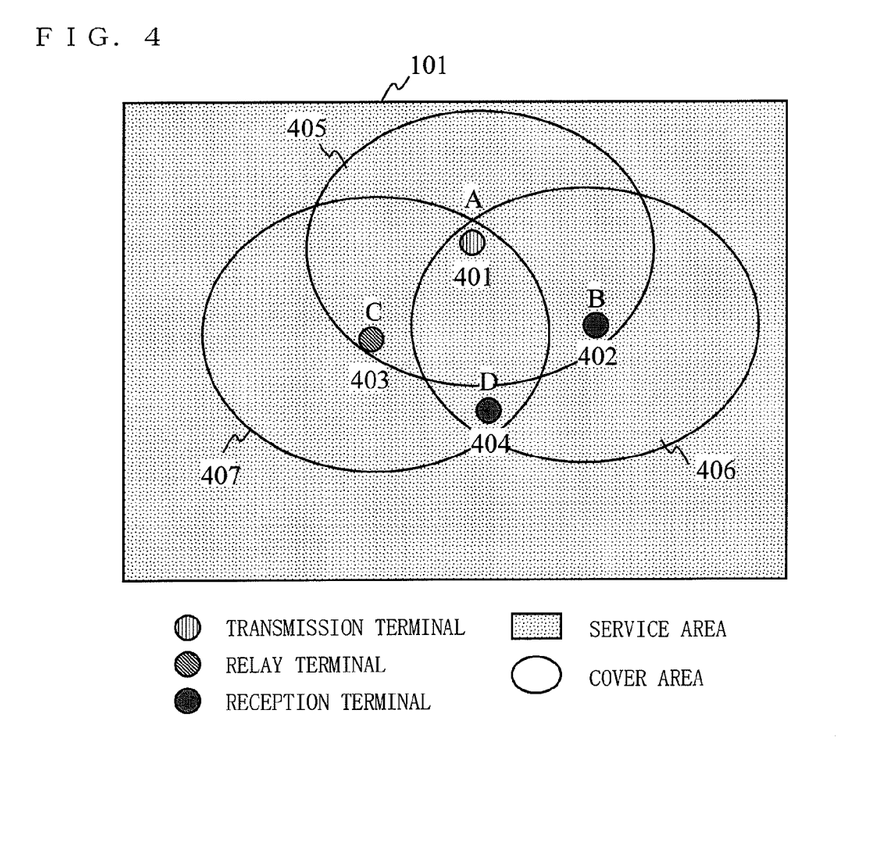
FIG. 4 shows a state diagram in the case where a collision does not occur among packets in the embodiment.

FIG. 4 shows a network diagram in the case where a collision does not occur among flooding packets. Referring to FIG. 4, in the service area 101, there are four terminals, that is, a transmission terminal A401, a reception terminal B402, a relay terminal C403, and a reception terminal D404. A cover area 405 of the transmission terminal A401 includes the reception terminal B402 and the relay terminal C403, and does not include the reception terminal D404. The reception terminal D404 is present in a cover area 406 of the reception terminal B402 and in a cover area 407 of the relay terminal C403, and can receive a flooding packet from the transmission terminal A401 owing to the relay terminal C403 performing relaying.

Figure 5:
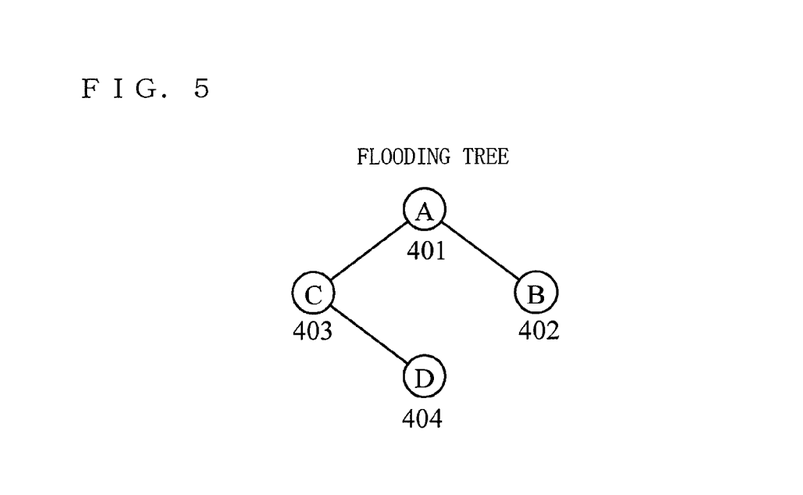
FIG. 5 shows a configuration of a tree in the case where a collision does not occur among packets in the embodiment.

FIG. 5 shows a flooding tree in a state shown in FIG. 4. Referring to FIG. 5, the transmission terminal A401 is connected to the reception terminal B402 and the relay terminal C403, and the reception terminal D404 is connected to the relay terminal C403.

Figure 6:
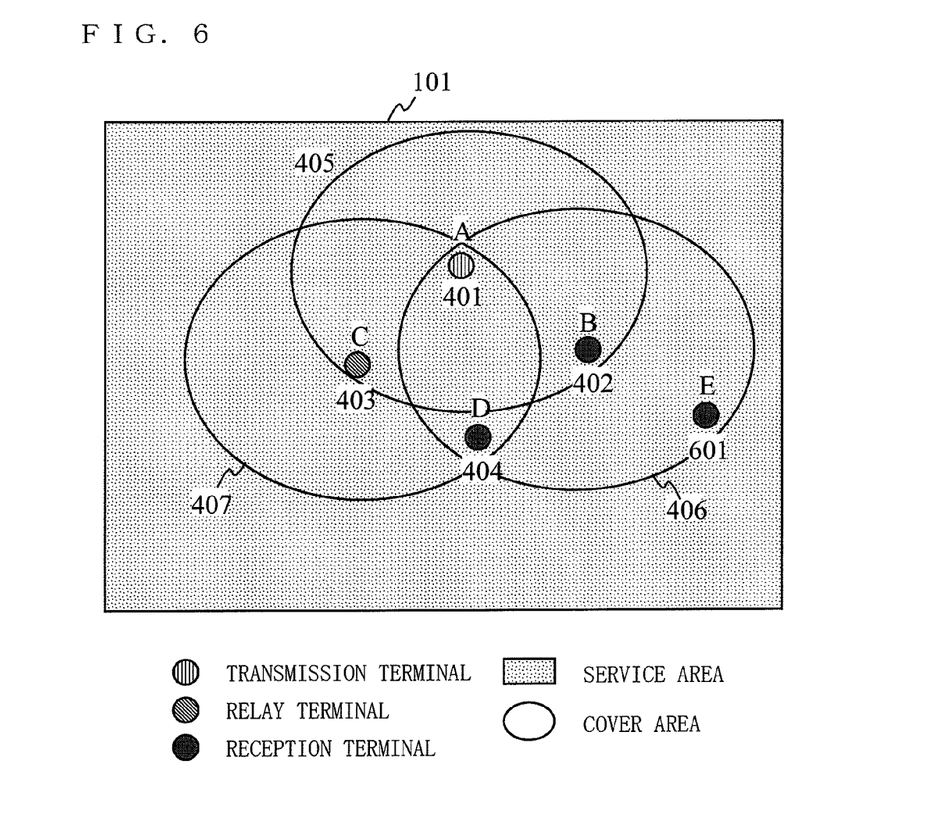
FIG. 6 shows a state diagram in the case where a collision occurs among packets in the embodiment.

FIG. 6 shows a network diagram in the case where a new reception terminal E601 is added in the state shown in FIG. 4. Referring to FIG. 6, the reception terminal E601 is not included in the cover area 405 of the transmission terminal A401 or the cover area 407 of the relay terminal C403. However, the reception terminal E601 is included in the cover area 406 of the reception terminal B402. Therefore, the reception terminal B402 functions as a relay terminal. A flooding packet is relayed to the reception terminal E601 by the relay terminal B402.

Figure 7:
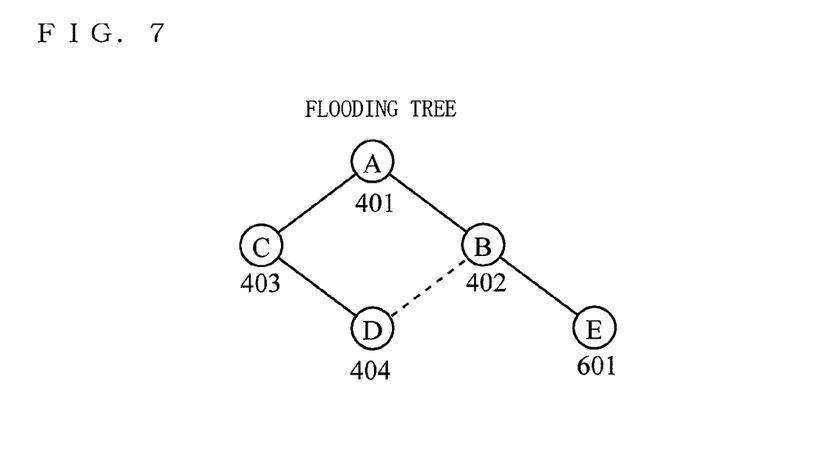
FIG. 7 shows a configuration of a tree in the case where a collision occurs among packets in the embodiment.

FIG. 7 shows a flooding tree in a state shown in FIG. 6. Similarly to the case of FIG. 5, the transmission terminal A401 is connected to the relay terminal B402 and the relay terminal C403, and the reception terminal D404 is connected to the relay terminal C403. However, since the reception terminal D404 is included in the cover area 406 of the reception terminal B402, when the reception terminal B402 starts relaying as a relay terminal, the reception terminal D404 receives the flooding packet also from the relay terminal B402. Note that, the relay terminal B402 and the relay terminal C403 receive the flooding packet from the transmission terminal A401 at the same time.

In this case, since the reception terminal D404 is included in both the cover area 406 of the relay terminal B402 and the cover area 407 of the relay terminal C403, the reception terminal D404 receives the flooding packet from a plurality of terminals at the same time. Therefore, a collision occurs among the packets and the reception terminal D404 cannot properly receive the packet from either of them. Accordingly, it is necessary to change a timing of transmission performed by the relay terminal B402 or the relay terminal C403. In the present embodiment, the reception terminal D404 detects that the packet loss is due to a collision, and transmits, toward the network, a control packet for changing a timing of transmission of the flooding packet, or the like.

Figure 8A:
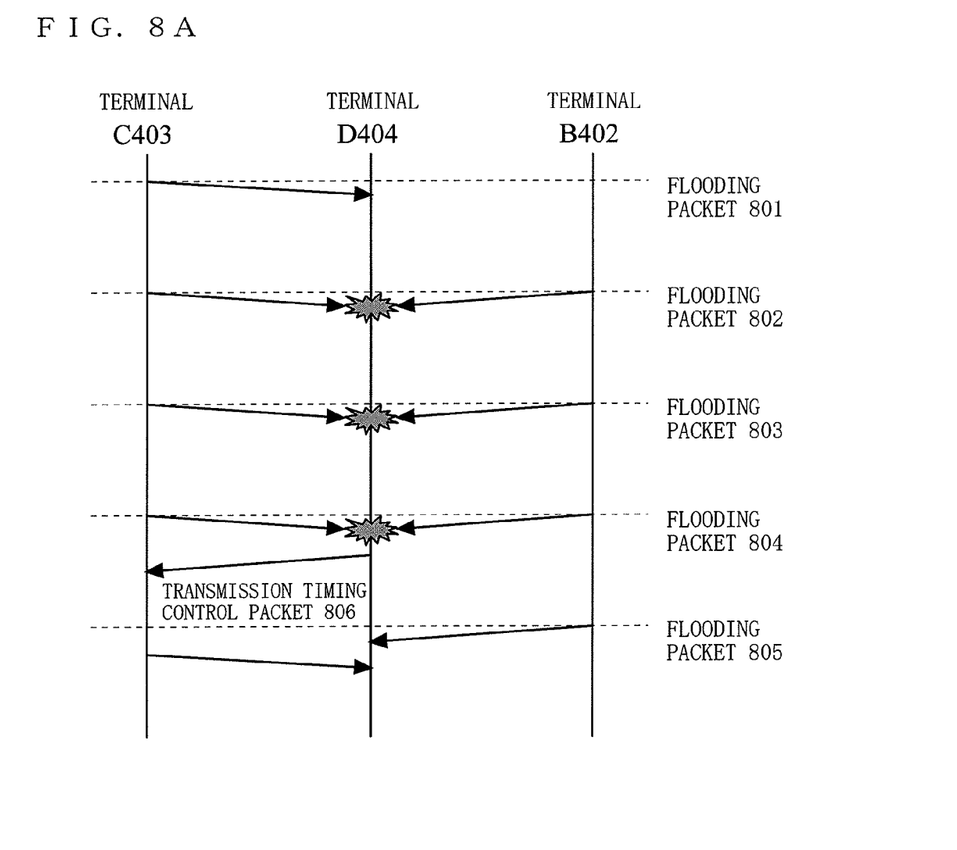
FIG. 8A is a sequence diagram showing a transmission and a reception of a flooding packet in the embodiment.

FIG. 8A is a sequence diagram showing a transmission and a reception of a flooding packet in the embodiment. At the beginning, the reception terminal D404 receives a flooding packet 801 from the relay terminal C403 (see FIG. 4). Next, since the reception terminal E601 is newly added, the terminal B402 functions as a relay terminal and the reception terminal D404 receives flooding packets 802 from the relay terminal B402 and the relay terminal C403 at the same time (see FIG. 6). Therefore, a collision occurs and the reception terminal D404 cannot completely receive the flooding packet 802. In the case where an ad-hoc network is formed by terminals, such as PLC terminals, which do not move, when the above state begins, collisions repeatedly occur and subsequent flooding packets 803 and 804 cannot be received as well. That is, the reception terminal D404 continues to be substantially out of the network, and the reception terminal D404 cannot return to the network.

However, since it does not occur that a PLC terminal moves to be out of the cover area, it can be presumed that, if packet losses are consecutively caused, the packet losses are due to a collision. In addition, when a plurality of relay terminals transmit flooding packets, a timing at which each of the plurality of relay terminals transmits the flooding packet toward the network is such that back-off times for transmission of the flooding packets are different among the plurality of relay terminals. Therefore, even if a collision occurs among the flooding packets, there is a high possibility that a header portion of the flooding packet transmitted prior to other flooding packets can reach the reception terminal.

Accordingly, in the present embodiment, the reception terminal D404 determines based on a header portion of a flooding packet whether or not there is a collision among flooding packets transmitted from a plurality of relay terminals. That is, when the reception terminal D404 receives a plurality of flooding packets which are defective in payload portions thereof during a predetermined time period among flooding packets which periodically come up in the network, the reception terminal D404 determines whether or not source addresses included in header portions of the flooding packets which are defective in the payload portions thereof include a source address which is not identical to the other source addresses. When there is a source address which is not identical to the other source addresses, the reception terminal D404 determines that a collision is occurring among the flooding packets transmitted from the plurality of relay terminals.

As described above, since whether or not there is a collision among flooding packets is determined based on whether or not source addresses included in header portions of the flooding packets, which are more likely to reach the reception terminal than payload portions of the flooding packets, are identical, it can easily be determined whether the flooding packet cannot be received due to a noise or due to a collision. As a result, the reception terminal D404 can be prevented from continuing to be out of the network due to a collision among the flooding packets transmitted from the plurality of relay terminals.

Moreover, when the reception terminal D404 determines that the cause is a collision, the reception terminal D404 investigates whether or not the reception terminal D404 is actually receiving the flooding packet transmitted from a plurality of relay terminals, and transmits, to one of the plurality of relay terminals, the transmission timing control packet 806 for delaying a timing of transmission of the flooding packet. Here, it is assumed that the transmission timing control packet 806 is transmitted to the relay terminal C403. Thus, the flooding packet from the relay terminal C403 which has received the transmission timing control packet 806 is transmitted later than the flooding packet 805 from the relay terminal B402. Therefore, the reception terminal D404 can receive the flooding packet from one of the relay terminal B402 and the relay terminal C403.

As a result, the reception terminal D404 can be prevented from continuing to be unable to receive the flooding packet due to a collision among the flooding packets and continuing to be substantially out of the network. The transmission timing control packet 806 may be set so as to delay a timing of transmission of the flooding packet by at least one packet, for example. In this case, since the flooding packet from the relay terminal C403 is transmitted with at least one packet delay in comparison with the flooding packet 805 from the relay terminal B402, complete reception of the flooding packet can be ensured.

Note that, when addresses of the relay terminals are not identified, the reception terminal D404 may transmit the transmission timing control packet 806 to a terminal from which the reception terminal D404 has received a flooding packet before. In this case, there is a possibility that a collision can be avoided without the need for particular investigations. The terminal C403 which has received the transmission timing control packet 806 sets a timing of transmission of the flooding packet 805 so as to transmit the flooding packet 805 after the terminal B402 transmits the flooding packet. Thus, the reception terminal D404 can completely receive the flooding packet 805.

Figure 8B:
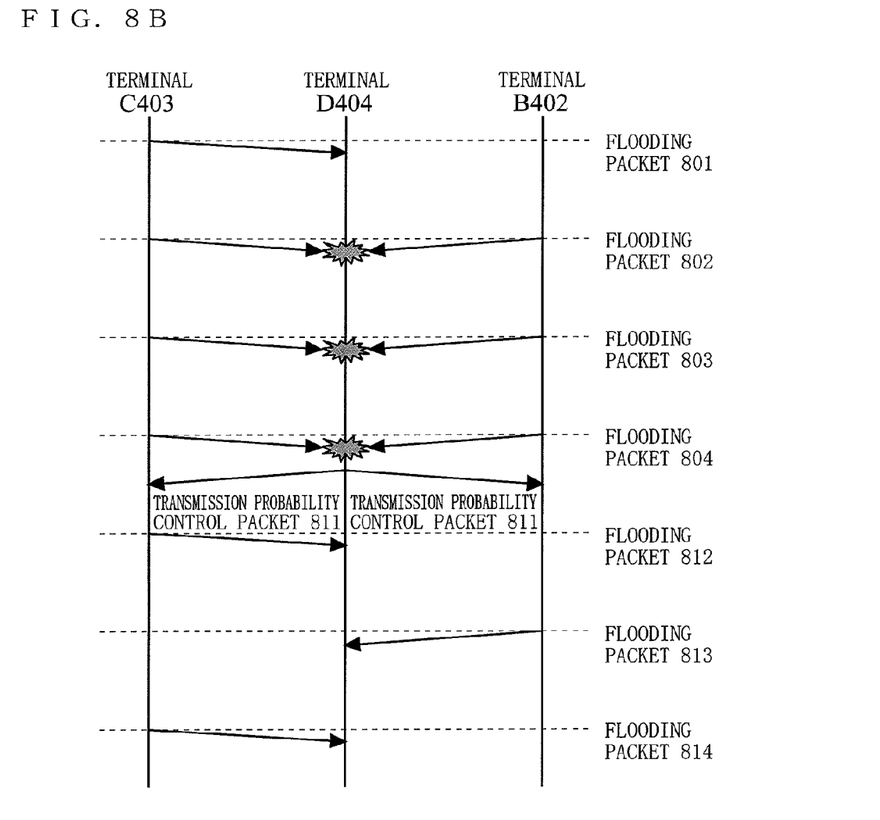
FIG. 8B is another sequence diagram showing a transmission and a reception of a flooding packet in the embodiment.

FIG. 8B is another sequence diagram showing a transmission and a reception of a flooding packet in the embodiment. At the beginning, the reception terminal D404 receives a flooding packet 801 from the relay terminal C403 (see FIG. 4). Next, since the reception terminal E601 is newly added, the terminal B402 functions as a relay terminal and the reception terminal D404 receives flooding packets 802 from the relay terminal B402 and the relay terminal C403 at the same time (see FIG. 6). Therefore, a collision occurs among the flooding packets 802 and the reception terminal D404 cannot completely receive the flooding packet 802. In the case where an ad-hoc network is formed by terminals, such as PLC terminals, which do not move, when the above state begins, collisions repeatedly occur and subsequent flooding packets 803 and 804 cannot be received as well. That is, the reception terminal D404 continues to be substantially out of the network, and the reception terminal D404 cannot return to the network.

However, since it does not occur that a PLC terminal moves to be out of the cover area, it can be presumed that, if packet losses are consecutively caused, the packet losses are due to a collision. In addition, when a plurality of relay terminals transmit flooding packets, a timing at which each of the plurality of relay terminals transmits the flooding packet toward the network is such that back-off times for transmission of the flooding packets are different among the plurality of relay terminals. Therefore, even if a collision occurs among the flooding packets, there is a high possibility that a header portion of the flooding packet transmitted prior to other flooding packets can be received.

Moreover, even if defective flooding packets are consecutively received during a certain time period and also, header portions cannot be detected from the defective flooding packets, it is possible to determine that a loss is caused by a collision. That is, if a header portion is not detected from the defective flooding packets during a certain time period, it is considered that, since the number of terminals in the network which transmit the flooding packets increases, the number of overlapping timings of transmission of the flooding packets increases and a probability of collisions of the flooding packets also increases.

Accordingly, in the present embodiment, the reception terminal transmits, by broadcast, a transmission probability control packet 811 for instructing terminals present within a communication area of the reception terminal to change a probability of transmission of the flooding packet. For example, the relay terminal C403 having received the transmission probability control packet 811 changes a probability of transmission of the flooding packet such that, if the relay terminal has been transmitting the flooding packet five times within a predetermined time period, the relay terminal transmits the flooding packet three time, the timings of the three transmissions being selected from among the timings of the five transmissions. In this case, since a state in which the reception terminal D404 cannot continue to receive the flooding packets is changed by the instruction from the reception terminal D404, a possibility that the reception terminal D404 can receive a flooding packet 812, 813, or 814 increases.

Note that, the probability of transmission may be set by the reception terminal based on the number of nearby terminals or a loss rate, or may be set by a transmission terminal. Thereafter, if the terminal does not become out of the network, the probability of transmission may remain changed, or may be returned to its original value to perform transmission timing control.

Figure 9:
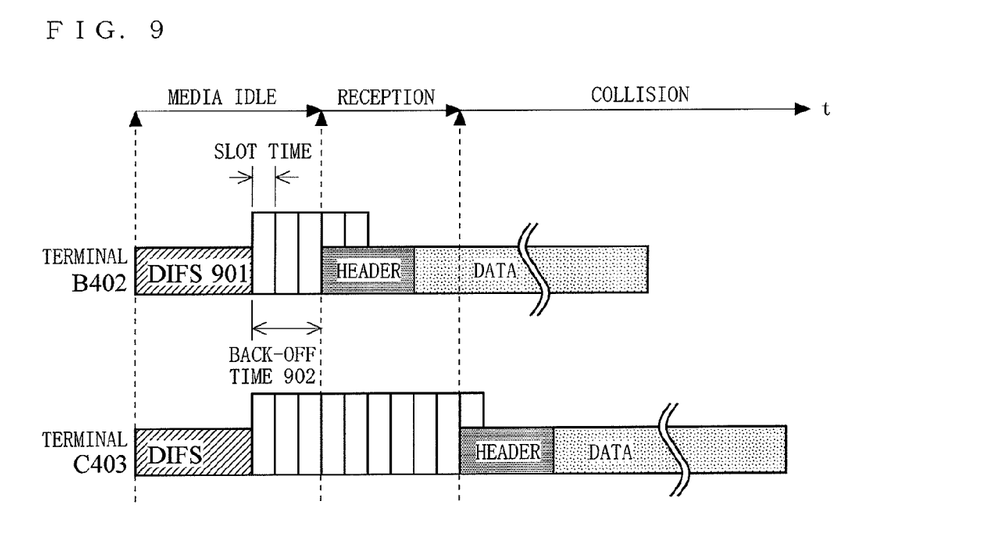
FIG. 9 shows a method of detecting a relay terminal causing a collision among packets.

Referring to FIG. 9, a method of detecting relay terminals causing a collision will be described. Generally, in a network, such as a wireless LAN (Local Area Network), where CSMA (Carrier Sense Multiple Access) is used, a collision can occur among packets when terminals which are not included in each other's cover area perform transmissions at the same time. Therefore, each terminal using the CSMA confirms that a communication path has not been used for more than a certain time period, and then transmits data. This waiting time is a time obtained by adding a waiting time (hereinafter, back-off time 902) having a random length to a minimum time (hereinafter, DIFS 901). Thus, a plurality of terminals are prevented from simultaneously transmitting packets a certain time after performing the last communications.

However, among terminals which are not included in each other's cover area, one terminal cannot detect that other terminals have started transmitting data. For example, in the present embodiment, the relay terminal C403 cannot detect that the relay terminal B402 has started transmitting data (see FIG. 6). In addition, the back-off time is much shorter than a time taken to finish receiving data. Therefore, there is a possibility that, before a reception of data from one terminal is finished, other terminals start transmitting data and thus a collision occurs.

Information about a source address of a relay terminal, and the like in a flooding packet is included in the head of the packet which is called a header portion. Since a time taken to receive a header portion is short, the time may be included in the back-off time. For example, a header portion of a flooding packet transmitted from the relay terminal B402 is included in a back-off time which is a waiting time for the relay terminal C403 to transmit a flooding packet. In this case, even when a collision occurs among the flooding packets, the reception terminal D404 can receive the header portion of the flooding packet transmitted from the relay terminal B402.

Accordingly, in the present embodiment, the reception terminal D404 detects, by using the back-off time, that the reception terminal D404 receives the flooding packets from a plurality of relay terminals. That is, in the present embodiment, the reception terminal D404 determines based on the header portion of the flooding packet whether or not there is a collision among the flooding packets transmitted from the plurality of relay terminals. Specifically, when the reception terminal D404 receives a plurality of flooding packets which are defective in payload portions thereof within a predetermined time period among flooding packets which periodically come up in the network, the reception terminal D404 determines whether or not source addresses included in header portions of the flooding packets which are defective in the payload portions thereof include a source address which is not identical to the other source addresses. When there is a source address which is not identical to the other source addresses, the reception terminal D404 determines that the flooding packets transmitted from the plurality of relay terminals collide with each other.

As described above, since whether or not there is a collision among flooding packets is determined based on whether or not source addresses included in header portions of the flooding packets, which are more likely to reach the reception terminal than payload portions of the flooding packets, are identical, it can easily be determined whether the flooding packet cannot be received due to a noise or due to a collision.

As a result, the reception terminal D404 can be prevented from continuing to be out of the network due to a collision among the flooding packets transmitted from the plurality of relay terminals.

Figure 10:
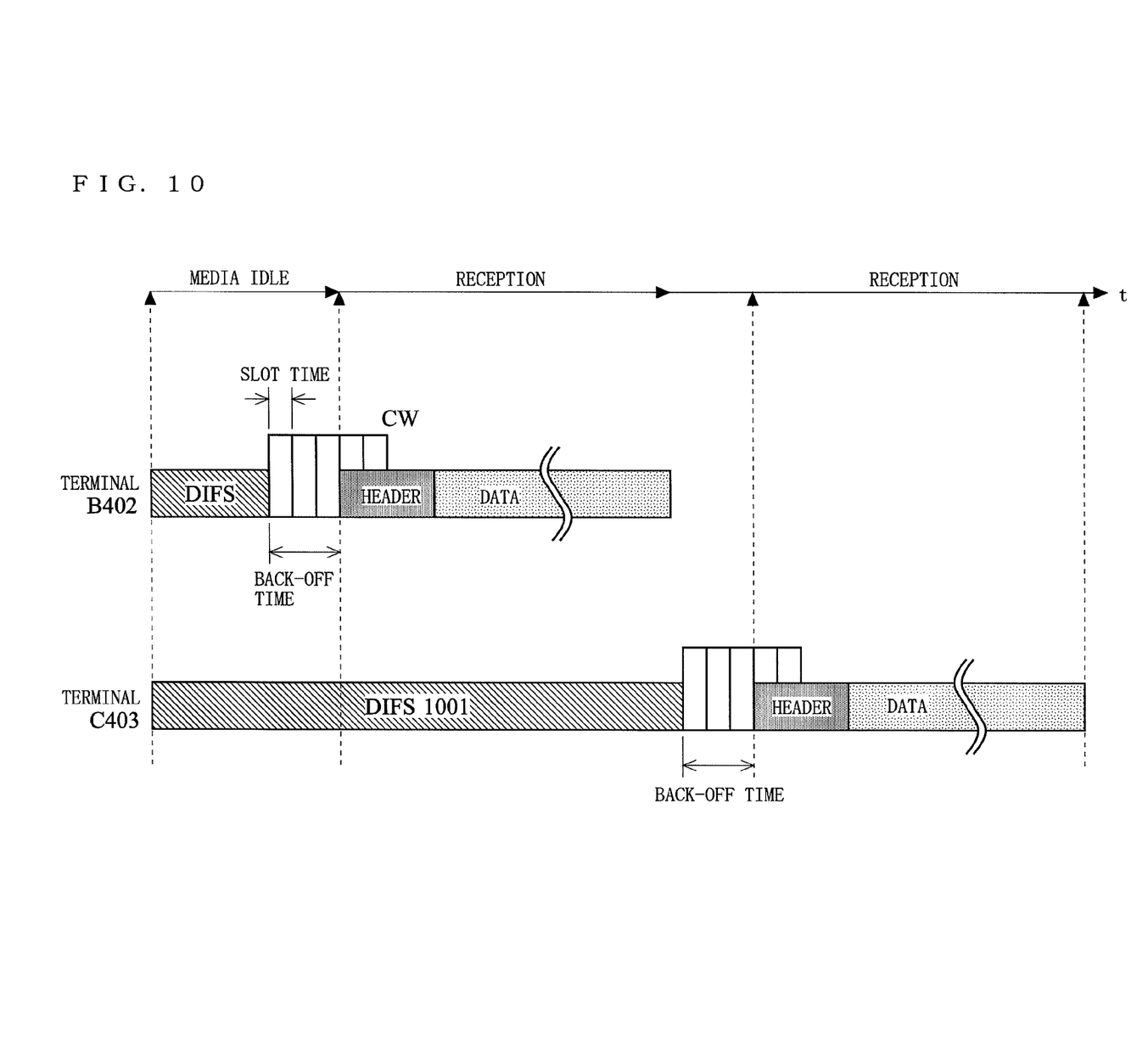
FIG. 10 shows an operation of transmission timing control.

Referring to FIG. 10, operation of transmission timing control of a flooding packet is illustrated. Referring to FIG. 10, when the relay terminal C403 receives a transmission timing control packet from the reception terminal D404, a time obtained by, for example, adding a time taken to transmit one flooding packet to a DIFS for a normal packet is set as a DIFS 1001 for a flooding packet which is a minimum waiting time. Thus, the flooding packet from the relay terminal C403 which has received the transmission timing control packet is transmitted later than the flooding packet from the relay terminal B402. Therefore, the reception terminal D404 can receive the flooding packet from at least one of the relay terminal B402 and the relay terminal C403.

As a result, a collision can be avoided without greatly delaying the flooding packet. In addition, the reception terminal D404 can be prevented from continuing to be unable to receive the flooding packet due to a collision among the flooding packets and to be substantially out of the network. For example, if a timing of transmission of the flooding packet is delayed by at least one packet, since the flooding packet from the relay terminal C403 is transmitted with at least one packet delay in comparison with the flooding packet 805 from the relay terminal B402, complete reception of the flooding packet can be ensured.

Figure 11:
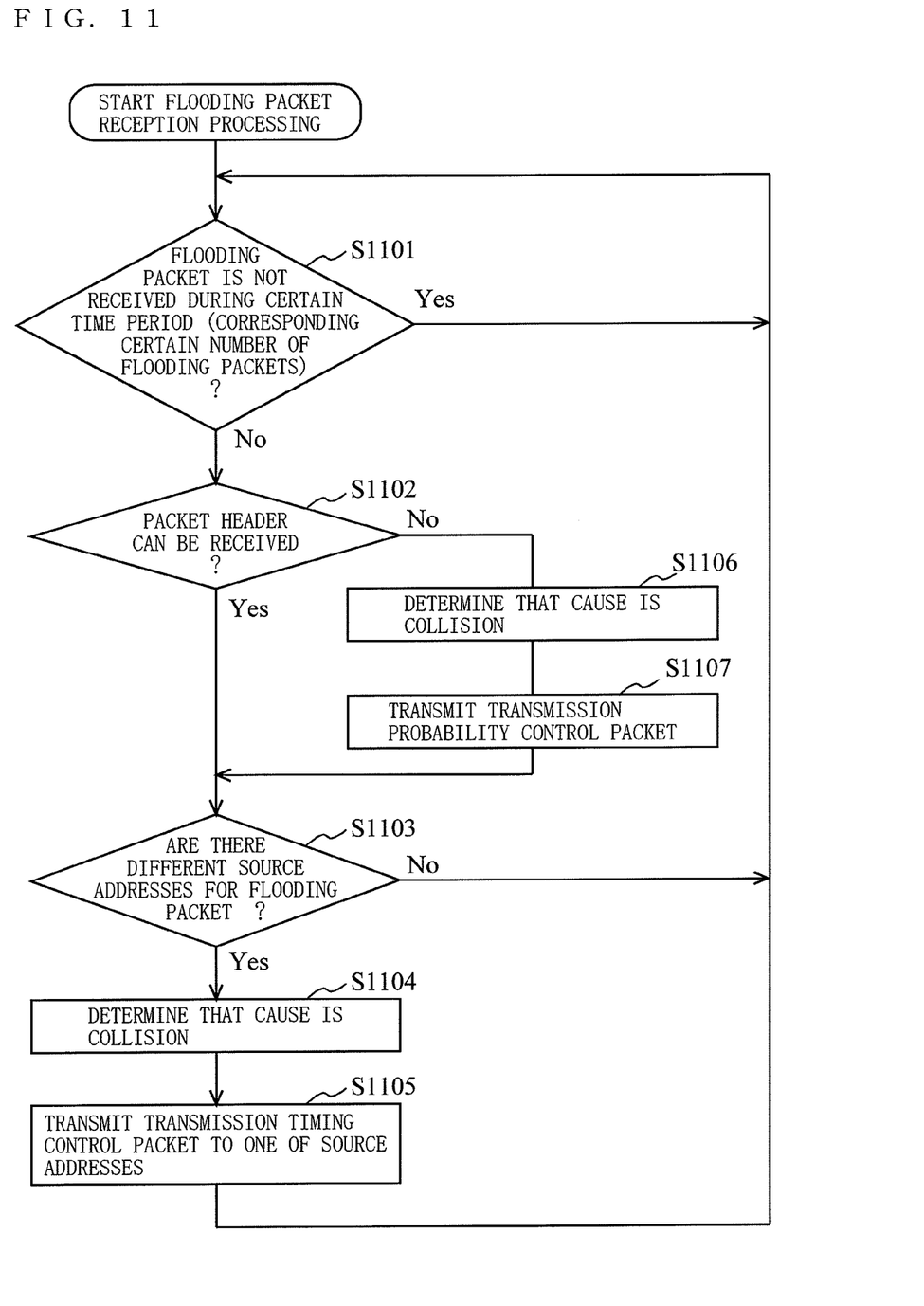
FIG. 11 is a flowchart showing reception processing on a terminal.

FIG. 11 is a flowchart of processing performed when each terminal receives a flooding packet. Referring to FIG. 11, first, a reception terminal for receiving a flooding packet determines whether or not the reception terminal has not received a flooding packet during a certain time period (step S1101). In the present embodiment, a flooding packet which is periodically transmitted is used. However, other flooding packets may be used. In the case where a flooding packet which is periodically transmitted is used, since it does not occur that the reception terminal, which is a PLC terminal, moves to be out of the cover area, it can be presumed that, if packet losses are consecutively caused, the packet losses are due to a collision. Note that, in a network where nonperiodical flooding packets are transmitted and received, sequence numbers may be assigned to the flooding packets and it may be confirmed based on a lack of the sequence number that packet losses are repeatedly caused.

At this phase, it cannot be determined whether the packet losses are due to a collision or due to a noise.

Next, if the reception terminal has received a flooding packet within the certain time period, since a packet loss is not caused, the reception terminal performs normal processing again. On the other hand, if the reception terminal has not received a flooding packet during the certain time period, the reception terminal determines whether or not the reception terminal has received at least a header portion of the flooding packet (step S1102). Here, if the reception terminal receives at least a header portion of the flooding packet, the reception terminal confirms that the reception terminal has received a source address included in the header portion of the flooding packet. The reception terminal determines whether or not different source addresses are present for the flooding packet (step S1103). If different source addresses are present for the flooding packet, the reception terminal determines that losses of flooding packet are caused by a collision (step S1104).

That is, when a plurality of relay terminals transmit flooding packets, a timing at which each of the plurality of relay terminals transmits the flooding packet toward the network is such that back-off times for transmission of the flooding packets are different among the plurality of relay terminals. Therefore, even if a collision occurs among the flooding packets, there is a high possibility that a header portion of a flooding packet transmitted prior to other flooding packets can reach the reception terminal.

Accordingly, in the present embodiment, it is determined based on a header portion of a flooding packet whether or not there is a collision among flooding packets transmitted from a plurality of relay terminals. Thus, since whether or not there is a collision among flooding packets is determined based on whether or not source addresses included in header portions of the flooding packets, which are more likely to reach the reception terminal than payload portions of the flooding packets, are identical, it can easily be determined whether the flooding packet cannot be received due to a noise or due to a collision. As a result, the reception terminal can be prevented from continuing to be out of the network due to a collision among the flooding packets transmitted from the plurality of relay terminals.

When the reception terminal determines that losses of the flooding packets are caused by a collision, the reception terminal transmits a transmission timing control packet to one of the different source addresses (step S1105). Thus, the flooding packet from the relay terminal which has received the transmission timing control packet is transmitted later than the flooding packets from the other relay terminals. Therefore, the reception terminal can receive the flooding packet from one of the plurality of relay terminals without a collision. As a result, the reception terminal can be prevented from continuing to be unable to receive the flooding packet due to a collision among the flooding packets and to be substantially out of the network.

The transmission timing control packet may be set so as to delay a timing of transmission of the flooding packet by at least one packet, for example. In this case, the flooding packet from the relay terminal which has received the transmission timing control packet is transmitted with at least one packet delay in comparison with the flooding packets from the other relay terminals, complete reception of the flooding packet can be ensured.

If, in step S1102, the reception terminal has not received a flooding packet during a certain time period and has not received a header portion of a flooding packet, either, the reception terminal determines that losses are caused by a collision (step S1106). That is, if the header portion of a flooding packet cannot be received during a certain time period, either, it is considered that, since the number of terminals which transmit flooding packets increases in the network, the number of overlapping timings of transmission of the flooding packets increases and a probability of collisions of the flooding packets also increases.

In this case, the reception terminal transmits a transmission probability control packet for instructing a terminal present within a communication area of the reception terminal to change a probability of transmission of the flooding packet (step S1107). For example, the relay terminal having received the transmission probability control packet changes a probability of transmission of the flooding packet such that, if the relay terminal has been transmitting the flooding packet five times within a predetermined time period, the relay terminal transmits the flooding packet three times, the timings of the three transmissions being selected from among the timings of the five transmissions. In this case, since a state in which the reception terminal cannot continue to receive the flooding packets is changed by the instruction from the reception terminal, a possibility of receiving the flooding packets increases.

If, in step S1103, the reception terminal determines that packet losses are consecutively caused during a certain time period and that different source addresses are not detected from the header portions of the flooding packets, the reception terminal determines that the losses of the flooding packets are temporarily caused by a noise, and performs normal processing again.

Figure 12:
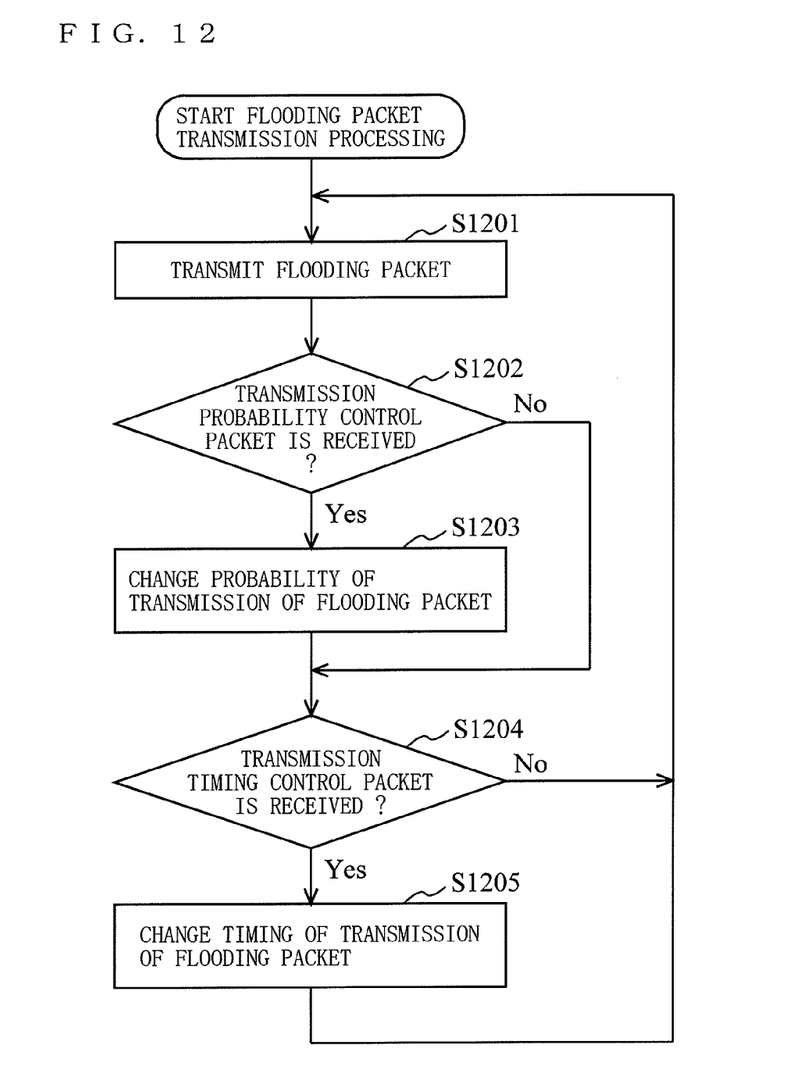
FIG. 12 is a flowchart showing transmission processing on the terminal.

FIG. 12 is a flowchart of processing performed when each terminal transmits a flooding packet. Referring to FIG. 12, first, a relay terminal for relaying the flooding packet transmits the flooding packet (step S1201). Next, the relay terminal determines whether or not the relay terminal has received a transmission probability control packet from a reception terminal (step S1202). If the relay terminal has not received a transmission probability control packet, processing proceeds to step S1204. On the other hand, if the relay terminal receives the transmission probability control packet, the relay terminal changes a probability of transmission of the flooding packet in accordance with the received transmission probability control packet (step S1203). For example, the relay terminal changes a probability of transmission of the flooding packet such that, if the relay terminal has been transmitting the flooding packet five times within a predetermined time period, the relay terminal transmits the flooding packet three times, the timings of the three transmissions being selected from among the timings of the five transmissions. Thus, since a state in which the reception terminal cannot continue to receive the flooding packets is changed by the instruction from the reception terminal, a possibility that the reception terminal receives the flooding packet increases.

Next, the relay terminal determines whether or not the relay terminal has received a transmission timing control packet (step S1204). If the relay terminal has not received a transmission timing control packet, the relay terminal performs processing for transmitting the flooding packet again. On the other hand, if the relay terminal has received a transmission timing control packet, the relay terminal changes a timing of transmission of the flooding packet in accordance with the received transmission timing control packet (step S1205). Thus, since the flooding packet from the relay terminal which has received the transmission timing control packet is transmitted later than the flooding packets from the other relay terminals, the reception terminal can receive the flooding packet from at least one of the relay terminals.

As a result, a collision can be avoided without greatly delaying the flooding packet. In addition, the reception terminal can be prevented from continuing to be unable to receive the flooding packet due to a collision among the flooding packets and to be substantially out of the network. For example, if a timing of transmission of the flooding packet is delayed by at least one packet, since the flooding packet from the relay terminal which has received the transmission timing control packet is transmitted with at least one packet delay in comparison with the flooding packets from the other relay terminals, complete reception of the flooding packet can be ensured.

Industrial Applicability

The present invention can provide a communication apparatus and a communication method which, in an ad-hoc network using a power line, when a control packet cannot be received for a certain time period, can determine whether or not the communication apparatus cannot receive the control packet due to a noise, and can be prevented from continuing to be out of the network due to a collision among control packets transmitted from a plurality of relay terminals.

Description of the Reference Characters 101 service area
102 to 110, 401 to 404, 601 terminal
201 memory
202 CPU
203 network interface
301 reception processing section
302 transmission processing section
303 collision determination section
304 control packet transmission section
305 transmission control section
405 to 407 cover area
801 to 806, 811 to 814 packet

The invention claimed is:

1. A communication apparatus for transmitting and receiving packets to and from a plurality of other communication apparatuses, the communication apparatus comprising:
   a communication section configured to receive a first control packet and a second control packet; and
   a control section, wherein
   the control section is configured to:
      determine whether a payload portion of the first control packet is defective;
      determine whether a payload portion of the second control packet is defective;
      if the payload portions of the first and second control packets are defective, determine whether a source address of the first control packet is different than a source address of the second control packet; and
      if the source addresses are different, determine that the first control packet and the second control packet originate from different communication apparatuses and have collided with each other.

2. The communication apparatus according to claim 1, wherein if the control section determines that the first and second control packets originate from different communication apparatuses and have collided with each other, the control section instructs one of the plurality of other communication apparatuses to delay a timing of transmission of its control packet.

3. The communication apparatus according to claim 2, wherein the control section gives, to the one of the plurality of other communication apparatuses, an instruction of delaying the timing of transmission of its control packet by at least one packet.

4. The communication apparatus according to claim 1, wherein each of the first and second control packets is transmitted by broadcast.

5. The communication apparatus according to claim 1, wherein each of the first and second control packets is transmitted by a power line.

6. The communication apparatus according to claim 1, wherein the first and second control packets are flooding packets.

7. A communication apparatus for transmitting and receiving packets to and from a plurality of other communication apparatuses, the communication apparatus comprising:
   a communication section configured to receive a first control packet and a second control packet; and
   a control section, wherein
   the control section is configured to:
      determine whether a header and payload portions of the first control packet are defective;
      determine whether a header and payload portions of the second control packet are defective
      if the headers and the payload portions of the first and second control packets are defective, instruct the plurality of other communication apparatuses present within a communication area of the communication apparatus to change a probability of transmission of control packets.

8. The communication apparatus according to claim 7, wherein each of the first and second control packets includes a beacon signal.

9. A communication method performed by a communication apparatus which transmits and receives packets to and from a plurality of other communication apparatuses, the method comprising:
    receiving, at the communication apparatus, a first control packet;
    receiving, at the communication apparatus, a second control packet;
    determining whether a payload portion of the first control packet is defective;
    determining whether a payload portion of the second control packet is defective;
    if the payload portions of the first and second control packets are defective, determining whether a source address of the first control packet is different than a source address of the second control packet; and
    if the source addresses are different, determining that the first control packet and the second control packet originate from different communication apparatuses and have collided with each other.

* * * * *